US010310478B2

(12) United States Patent
Chen et al.

(10) Patent No.: US 10,310,478 B2
(45) Date of Patent: Jun. 4, 2019

(54) POWER OPTIMIZATION SYSTEM FOR AIR-SIDE APPARATUS OF AIR CONDITIONING AND POWER OPTIMIZATION METHOD OF THE SAME

(71) Applicant: DELTA ELECTRONICS, INC., Taoyuan (TW)

(72) Inventors: Meng-Seng Chen, Taoyuan (TW); Tien-Szu Lo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 123 days.

(21) Appl. No.: 15/232,219

(22) Filed: Aug. 9, 2016

(65) Prior Publication Data

US 2017/0205101 A1    Jul. 20, 2017

(30) Foreign Application Priority Data

Jan. 19, 2016   (TW) .............................. 105101475 A (51) Int. Cl.
G05B 19/05        (2006.01)
F24F 11/30        (2018.01)
(Continued)

(52) U.S. Cl.
CPC .............. *G05B 19/05* (2013.01); *F24F 11/30* (2018.01); *F24F 11/62* (2018.01); *F24F 11/46* (2018.01);
(Continued)

(58) Field of Classification Search
CPC ............. F24F 11/006; F24F 2011/0075; F24F 11/0012; F24F 11/62; F24F 11/30;
(Continued)

(56) References Cited

U.S. PATENT DOCUMENTS 9,171,274 B2    10/2015  Desai et al.
2009/0182456 A1*   7/2009  Liao ..................... F24F 11/0001
                                              700/276
(Continued)

FOREIGN PATENT DOCUMENTS

CN    202648064    1/2013
CN    103542489    1/2014
(Continued)

OTHER PUBLICATIONS

Office Action dated Mar. 17, 2017 from corresponding application No. TW 105101475.

*Primary Examiner* — Yuhui R Pan
*Assistant Examiner* — Istiaque Ahmed
(74) *Attorney, Agent, or Firm* — Hauptman Ham, LLP (57) ABSTRACT

A power optimization system including an optimization processing unit and a plurality of air conditioning's air-side apparatuses is disclosed. The system obtains a target comfort value when people enter a zone, and calculates an improving demand for the zone's indoor environment to approach the target comfort value. The system then collects an improving capacity of each air-side apparatus by operating in different working modes in the current indoor environment. After that, the optimization processing unit calculates multiple working combinations according to the improving demand and the improving capacities of the air-side apparatuses for the indoor environment to approach the target comfort value, and chooses a most power-saving working combination according to the basic power consumption of the air-side apparatuses.

16 Claims, 6 Drawing Sheets

(51) Int. Cl.
*F24F 11/62* (2018.01)
*F24F 110/10* (2018.01)
*F24F 110/20* (2018.01)
*F24F 110/70* (2018.01)
*F24F 120/10* (2018.01)
*F24F 11/63* (2018.01)
*F24F 11/46* (2018.01)

(52) U.S. Cl.
CPC ........... *F24F 11/63* (2018.01); *F24F 2110/10* (2018.01); *F24F 2110/20* (2018.01); *F24F 2110/70* (2018.01); *F24F 2120/10* (2018.01); *G05B 2219/2614* (2013.01)

(58) Field of Classification Search
CPC .... F24F 11/63; F24F 2120/10; F24F 2110/20; F24F 2110/10; F24F 11/46; F24F 2110/70; G05B 2219/2614; G05B 19/05; Y02B 30/78

See application file for complete search history.

(56) References Cited

U.S. PATENT DOCUMENTS

| | | | |
|---|---|---|---|
| 2015/0308708 A1* | 10/2015 | Harada | G06Q 50/06 700/276 |
| 2016/0370029 A1* | 12/2016 | Kurelowech | F24F 12/006 |
| 2017/0219238 A1* | 8/2017 | Kibo | F24F 11/89 |

FOREIGN PATENT DOCUMENTS

| | | |
|---|---|---|
| CN | 105143781 A | 12/2015 |
| TW | M287418 U | 2/2006 |
| TW | 201017073 | 5/2010 |
| TW | 201118789 | 6/2011 |

\* cited by examiner

POWER OPTIMIZATION SYSTEM FOR AIR-SIDE APPARATUS OF AIR CONDITIONING AND POWER OPTIMIZATION METHOD OF THE SAME

BACKGROUND OF THE INVENTION

1. Field of the Invention

The invention relates to a power optimization system and a power optimization method, and in particularly to a power optimization system and a power optimization method for an air-side apparatus of an air conditioning.

2. Description of Prior Art

Many types of intelligent air conditioning systems are now provided in the market. These systems can operate air conditioning for adjusting environmental temperature in a target zone to adjust according to user demand, and continues to adjust or powers off the air conditioning after the user leaves or the user demand has been satisfied. Thus, users can use the air conditioning conveniently, and avoids wasting power.

For ensuring that the environmental temperature of a zone can satisfy user demand, the current intellectual air conditioning systems not only controls the air conditioning itself intellectually, but also adjusts each air-side apparatus of each zone, such as fan coil unit (FCU), pre-cooling air handling unit (PAH), variable refrigerant volume (VRV), etc., according to the status of each zone.

As mentioned above, the current intelligent air conditioning systems basically control each air-side apparatus separately, but not execute a synthesized determination for multiple zones at the same time, and not control all air-side apparatuses intellectually and simultaneously according to the result of the synthesized determination. Therefore, these air-side apparatuses cannot operate in coordination to reduce their power consumption.

For example, the aforementioned PAHs and FCUs can be operated in coordination. If the leaving-air temperature of the PAHs is low enough, the efficiency of the air conditioning is stabilized without controlling the FCUs to operate in the maximal fan speed. Take another example, if the FCUs operate in the maximal fan speed, the efficiency of the air conditioning is not decreased when reducing the fan speed of the PAHs. However, the current intellectual air conditioning systems don't concern the aforementioned problems so as to cause the power wasting of these air-side apparatuses.

Furthermore, a PAH usually takes charge of multiple zones in a building at the same time, even only one or few zones are applied with the user demand, a PAH controller may still control the PAH directly to make the environment of all related zones to meet the user demand, but not partially adjust FCU(s) of these related zones to meet the user demand (for example, increasing the fan speed of the FCU(s) related to the zones that are applied with the user demand, or turning off the valve of the FCU(s) related to the zones that are not applied with the user demand). As such, the power of these air-side apparatuses are wasted.

SUMMARY OF THE INVENTION

The main object of the present invention is to provide a power optimization system and a power optimization method for air-side apparatus of air conditioning, which can control air conditioning's air-side apparatuses to operate and assist the air conditioning to improve the indoor environment to approach a target comfort value in a most power-saving way.

To achieve the above object, the present invention discloses a power optimization system which includes an optimization processing unit and a plurality of air conditioning's air-side apparatuses, wherein the plurality of air-side apparatuses includes a pre-cooling air handling unit (PAH) and multiple fan coil units (FCUs). The system first obtains a target comfort value when people enter a zone, and calculates an improving demand for the zone's indoor environment to approach the target comfort value.

Next, the system collects an improving capacity of each air-side apparatus by operating in different working modes in the current indoor environment. Next, the optimization processing unit calculates multiple working combinations according to the improving demand and the improving capacities of each air-side apparatus for the indoor environment to approach the target comfort value, and chooses a most power-saving working combination according to basic power consumption of the air-side apparatuses.

Compared with prior art, the present invention considers the relationship among all of the air-side apparatuses and their own power consumption at the same time, and thus it can operate the air-side apparatuses to operate in a most power-saving way when improving the indoor environment to approach the target comfort value, so as to achieve the purpose of saving power.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
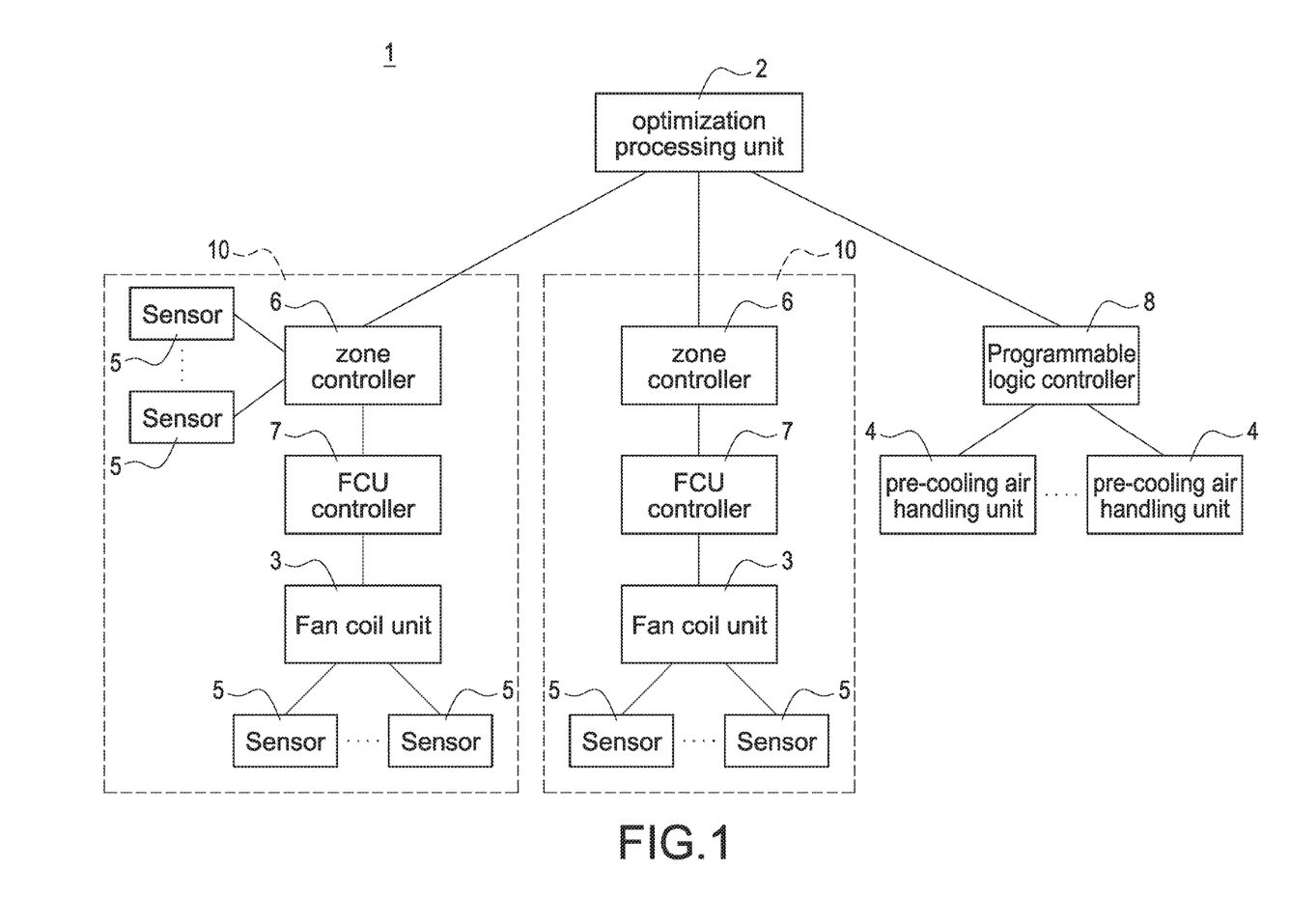
FIG. 1 is a system block diagram of a first embodiment according to the present invention.

FIG. 1 is a system block diagram of a first embodiment according to the present invention. The present invention discloses a power optimization system (refers to as the system 1 hereinafter) for air-side apparatuses of an air conditioning, the system 1 includes an optimization processing unit 2 and a plurality of air-side apparatuses of the air conditioning. In this embodiment, the plurality of air-side apparatuses includes, for example, a fan coil unit (FCU) 3 and a pre-cooling air handling unit (PAH) 4, and may also include a variable refrigerant volume (VRV) in other embodiment, not limited thereto.

In the present invention, the air-side apparatuses are used to execute an air exchanging operation for multiple zones 10 in a building. In particularly, the air-side apparatuses transmit cool air/hot air out from the air conditioning to each zone 10 in order to exchange the air inside each zone 10, therefore, the temperature and humidity of each zone 10 will be reduced/increased, and the carbon dioxide (CO2) quantity of each zone 10 will be reduced, too.

More specifically, as shown in FIG. 1, the system 1 can include a plurality of the FCUs 3 and a plurality of the PAHs 4. Generally, one PAH 4 takes charge of multiple zones 10 in a floor of the building, and one FCU 3 basically takes charge of one single zone 10. However, a zone with a large area can be corresponding to multiple FCUs 3 simultaneously.

The system 1 further includes a plurality of zone controllers (ZC) 6, a plurality of FCU controller 7 and a programmable logic controller (PLC) 8. Each FCU controller 7 is respectively arranged in different zone and connected to the FCU 3 of the arranged zone 10, and each FCU controller 7 controls the wokring mode of the connected FCU 3 (such as fan speed, valve on/off status, etc.).

Each ZC 6 is respectively arranged in different zone and connected to the optimization processing unit 2, and also connected to the FCU controller 7 arranged in the same zone, so as to receive the command from the optimization processing unit 2 and control the connected FCU controller 7 thereof. The PLC 8 is connected to the optimization processing unit 2 and the plurality of PAHs 4 simultaneously in order to send the command from the optimization processing unit 2 to each PAH 4.

The system 1 can selectively include a plurality of sensors 5, those are respectively arranged in different zone. Basically, each zone of the building can be arranged with multiple sensors 5 for sensing different types of data.

Taking a single zone 10 for example (such as a first zone), the sensors 5 can connect with the FCU 3 of the first zone for sensing multiple indoor environment parameters of the first zone and transmitting them to the FCU 3 directly. On the other hand, the sensors 5 can also connect with the ZC 6 of the first zone, and sense and transmit the indoor environment parameters of the first zone to the FCU controller 7 through the ZC 6, but not limited thereto.

In this embodiment, the sensors 5 connect with the optimization processing unit 2 through wireless way, so as to transmit the indoor environment parameters to the optimization processing unit 2 directly. Otherwise, they can transmit the indoor environment parameters to the optimization processing unit 2 through the FCU 3, the FCU controller 7 and/or the ZC 6, but not limited thereto.

In this embodiment, the plurality of indoor environment parameters mainly includes indoor temperature, indoor humidity, indoor CO2 quantity, indoor person amount, etc., of the first zone, but not limited thereto. More specifically, the plurality of sensors 5 may includes a human detector, which is used to detect if a person enters the first zone or not. Also, it trigers the system 1 to execute an optimization control when a person is detected to enter the first zone (detailed description below).

Figure 2:
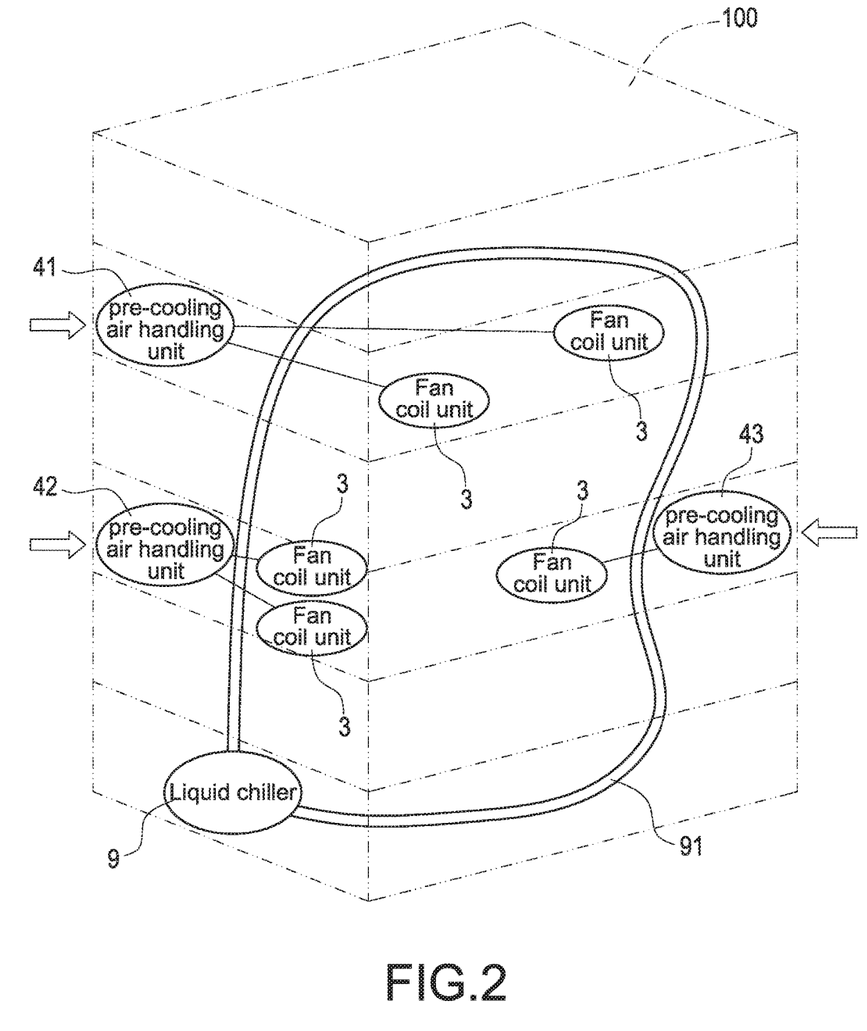
FIG. 2 is a schematic view showing system arrangement of a first embodiment according to the present invention.

FIG. 2 is a schematic view showing system arrangement of a first embodiment according to the present invention. As shown in FIG. 2, an air conditioning of a building 100 mainly includes water-side apparatuses such as a liquid chiller 9, a pipe 91, etc., and air-side apparatuses such as a plurality of the FCUs 3, a plurality of the PAH 4, etc., The liquid chiller 9 drains icy water out through the pipe 91 and receives warm or cold water with higher temperature. Each PAH 4 sucks outside air, and discharges the sucked air after filtering. The air discharged from each PAH 4 will pass through the pipe 91 and become cold air via cooling by the icy water inside the pipe 91, so the temperature of the cold air will be lower. Also, if the temperature of the cold air arrived each of the FCUs 3 is not low enough, each FCU 3 reduces the temperature of the cold air internally through a second time cooling, and then blows the cold air into each corresponding zone.

In this embodiment, each PAH 4 respectively takes charge of multiple zones in a single floor of the building 100, and each FCU 3 respectively takes charge of one single zone. As shown in FIG. 2, a PAH 41 takes charge of whole fifth floor of the building 100, and the PAH 41 adjusts the indoor environment of two zones of the fifth floor by cooperating with two of the FCUs 3. A PAH 42 takes charge of left side of third floor of the building 100, and the PAH 42 adjusts the indoor environment of two zones of the left side of the third floor by cooperating with two of the FCUs 3. A PAH 43 takes charge of right side of third floor of the building 100, and the PAH 43 adjusts the indoor environment of one zone of the right side of the third floor by cooperating with one of the FCU 3.

It should be mentioned that FIG. 2 is just a schematic view of the present invention, the PAHs actually have powerful ability and usually cooperates with multiple FCUs (such as five or ten of them) to maintain the environment of a single floor, but not cooperates with only one or two FCUs. The above description is just an embodiment of the present invention, but not limited thereto. For ease of describing, the following description will take only one single PAH 4 cooperating with one single FCU 3 to adjust the indoor environment of the first zone for an instance.

In the present invention, the optimization processing unit 2 is to obtain a first target comfort value of the first zone and a first improving demand needed by the indoor environment of the first zone to approach the first target comfort value when booting the air conditioning system. In particularly, the first target comfort value can be a default value, or be set manually by a person in the first zone (for example, the person can set the first target comfort value through APP or remote control).

The system 1 senses if a person enters the first zone through the human detector, and triggers the optimization processing unit 2 to obtain the first target comfort value and the first improving demand after sensing the person enters the first zone. In this embodiment, the first target comfort value includes a target temperature, a target humidity, a target CO2 quantity, etc., and the first improving demand includes a heat exchanging quantity and an air exchanging quantity which are necessary for the indoor temperature, the indoor humidity and the indoor CO2 quantity of the first zone to approach the target temperature, the target humidity and the target CO2 quantity.

After detecting the person enters the first zone and the system 1 is booted, the PAH 4 and the FCU 3 related to the first zone first execute an ability testing, and transmit respectively a testing result to the optimization processing unit 2. In particularly, the PAH 4 and the FCU 3 respectively test their own first improving capacity which can provide to the current indoor environment by operating in different working modes in the current indoor environment of the first zone. Also, the PAH 4 and the FCU 3 respectively transmit the first improving capacity to the optimization processing unit 2 after testing.

In this embodiment, the first improving capability is the heat exchanging quantity and the air exchanging quantity that are provided by the PAH 4 and the FCU 3 to the first zone in a time period (such as each minute) when operating in each working mode.

After receiving the first improving demand and the first improving capacity, the optimization processing unit 2 calculates a plurality of working combinations for the indoor environment of the first zone to approach the first target comfort value within a predicted time according to the first improving demand and the first improving capacity. In this embodiment, each working combination respectively records different control commands, and these control commands are used to control the PAH 4 to work and change, between multiple working modes (such as turns on, turns off, reduces motor speed, increases motor speed, turns on internal heater, turns off internal heater, etc.) in a specific time (such as in one minute, three minutes, ten minutes, etc.), and also used to control the FCU 3 to work and change, between multiple working modes (such as turns valve on, turns valve off, changes to high fan speed, changes to medium fan speed, changes to low fan speed, etc.).

In the present invention, the optimization processing unit 2 records a basic power consumption of the PAH 4 and the FCU 3 under each working mode. The optimization processing unit 2 chooses a most power-saving one of the working combinations (called the specific working combination) based on the basic power consumption, and controls the PAH 4 and the FCU 3 to operate respectively according to the specific working combination. Therefore, the system 1 can control the air-side apparatuses to operate in the most power-saving way and make sure the indoor environment of the first zone can approach the first target comfort value in the predicted time.

It should be mentioned that the system 1 in this embodiment is to receive the plurality of indoor environment parameters of the first zone by the FCU controller 7 of the first zone, and the FCU controller 7 calculates the first improving demand based on the first target comfort value and the indoor environment parameters, and the FCU controller 7 also calculates the first improving capacity of the PAH 4 and the FCU 3. Furthermore, the other zones also calculate the improving demand and the improving capacity in the same way. In this embodiment, the optimization processing unit 2 only needs to receive the first improving demand and the first improving capacity from the FCU controller 7, and then calculates and chooses the specific working combination according to the received first improving demand and the received first improving capacity. Therefore, the loading of the optimization processing unit 2 is reduced, and the technical effect of loading bypass is achieved.

In this embodiment, the FCU controller 7 calculates the first improving capacity of the PAH 4 and the FCU 3 according to several improving factors. In particularly, the improving factors can be, for example, at least one of multiple working modes of the FCU 3 (such as fan speed, valve on/off status, valve open degree, etc.), multiple working modes of the PAH 4 (such as fan speed, valve on, valve off, valve degree, etc.), outdoor temperature, size of the first zone, indoor temperature, indoor humidity, indoor $CO_2$ quantity, indoor person amount, current time, and environmental history data of the first zone, but not limited thereto.

Figure 3:
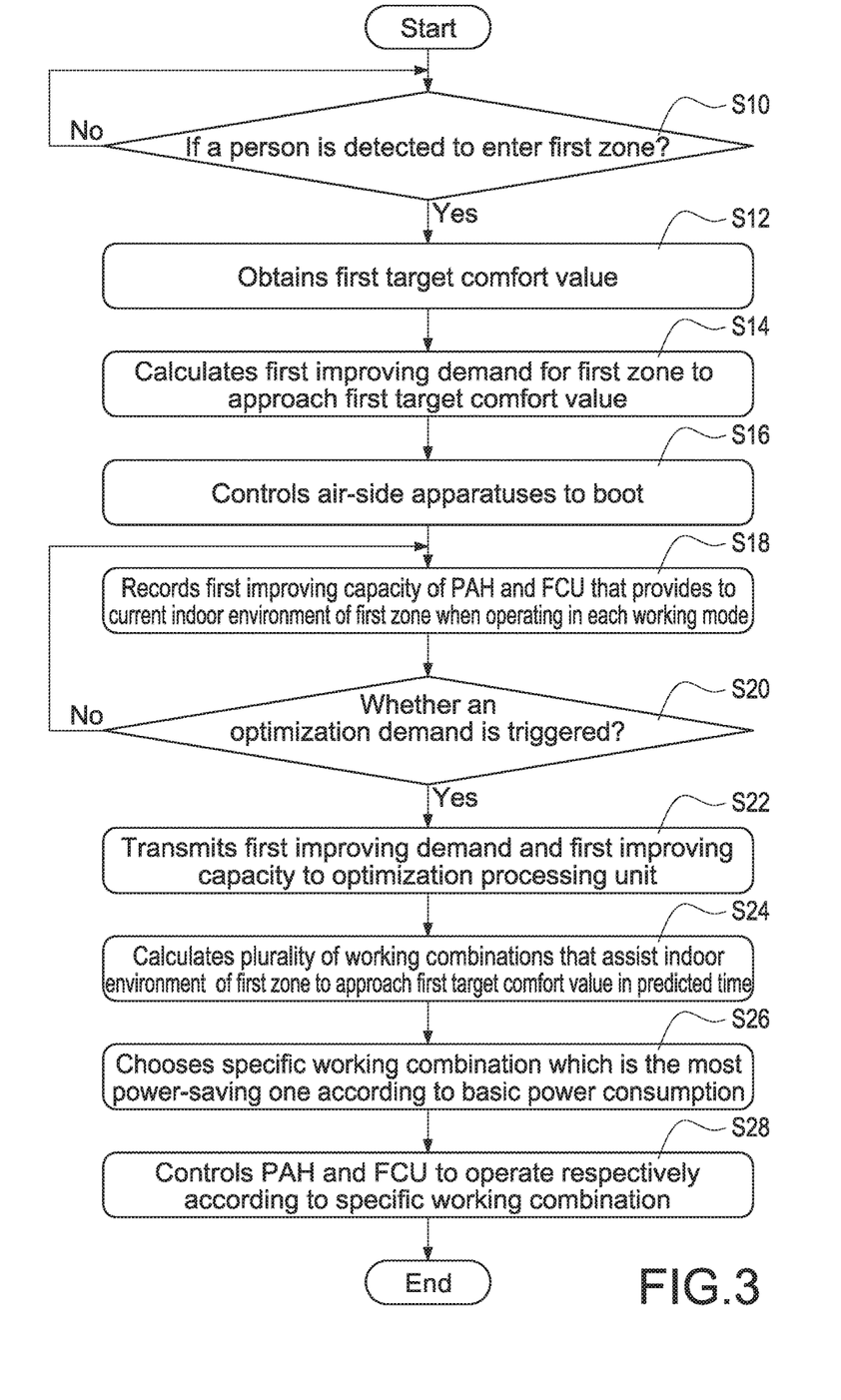
FIG. 3 is an optimization flowchart of a first embodiment according to the present invention.

FIG. 3 is an optimization flowchart of a first embodiment according to the present invention. FIG. 3 discloses a power optimization method for air-side apparatuses of an air conditioning (refers to as the method hereinafter). In the embodiment of FIG. 3, the single first zone is taken for an instance. First, the system 1 senses if a person enters the first zone through the plurality of sensors 5 (step S10), and triggers the optimization processing unit 2 to obtain the first target comfort value corresponding to the first zone after sensing the person enters the first zone (step S12).

Next, the system 1 calculates the first improving demand for the indoor environment of the first zone to approach the first target comfort value (step S14). As mentioned above, the first improving demand is the heat exchanging quantity and the air exchanging quantity for making the indoor temperature, the indoor humidity and the indoor $CO_2$ quantity of the first zone to approach the target temperature, the target humidity and the target $CO_2$ quantity of the first target comfort value.

After obtaining the first improving demand, the system 1 controls the plurality of air-side apparatuses to boot (step S16). In this embodiment, the system 1 either boots the PAH 4 or the FCU 3 first, or boots both of the PAH 4 and the FCU 3 simultaneously, not limited thereto. It should be mentioned that the PAH 4 and the FCU 3 can be preset power-off, or operate in sleep mode, and the system 1 then controls the PAH 4 and the FCU 3 to operate in working mode after sensing the person enters the first zone.

Next, the system 1 tests the first improving capacity of the PAH 4 and the FCU 3 that can provide to the current indoor environment of the first zone when operating in each working mode, and records the first improving capacity in an ability list (step S18). As mentioned above, the first improving capacity is the heat exchanging quantity and the air exchanging quantity that are provided by the PAH 4 and the FCU 3 to the first zone in a time period when operating in each working mode. Also, the first improving capacity may changes according to the variation of the environment of the first zone (for example, if the indoor temperature of the first zone drops, the improvement will be more difficult to achieve, so the first improving capacity will decrease).

For an instance, the system 1 can obtain and record the first improving capacity in the ability list after testing and calculation, and the ability list is exemplarily shown as below:

| | | Ability List | | |
|---|---|---|---|---|
| FCU Working Mode | PAH Working Mode | Environment Factor | Time | Heat Exchanging Quantity and Air Exchanging Quantity per minute |
| High Fan Speed | Turn On/ Discharging Temp: 20° | 5 persons indoor | 13:10.00 | A1 |
| Medium Fan Speed | Turn On/ Discharging Temp: 20° | 5 persons indoor | 13:10.30 | A2 |
| Low Fan Speed | Turn On/ Discharging Temp: 20° | 5 persons indoor | 13:11.00 | A3 |
| High Fan Speed | Turn Off | 5 persons indoor | 13:11.30 | A4 |
| Medium Fan Speed | Turn Off | 5 persons indoor | 13:12.00 | A5 |
| ... | ... | ... | ... | ... |

As shown in the above ability list, the system 1 can calculate the heat exchanging quantity and the air exchanging quantity (such as A1 to A5 as shown above) that are provided in a time period by operating in each working mode, and records the heat exchanging quantity and the air exchanging quantity in the ability list. It should be mentioned that the ability list can be regarded as an environmental history data of the system 1. If the system 1 needs to again obtain the first improving capacity of the PAH 4 and the FCU 3 afterward, it can test the PAH 4 and the FCU 3 in real time and also take the created ability list as a reference, so as to make the obtained first improving capacity more precise.

After the step S18, the system 1 determines to trigger an optimization demand (step S20) or not, for example, whether a preset time is reached (for example, presets to execute an optimization process every ten minutes), or whether the content of the ability list highly changes (for example, the heat exchanging quantity provided by the PAH 4 or the FCU 3 in the time period highly decreases). If the optimization demand is not triggered, then the system 1 goes back to the step S18, and keeps testing the first improving capacity and updating the ability list. If the optimization demand is triggered, the system 1 then transmits the first improving demand and the first improving capacity to the optimization processing unit 2 (step S22).

It should be mentioned that after the step S22, the system 1 can keep testing the first improving capacity and updating the ability list (such as presets to update the ability list every 5 minutes or every half hour), until the system 1 is powered off, but not limited thereto. Therefore, the content recorded in the ability list (i.e., the environmental history data) is more precise and closer to the real improving capacity that is provided to the current indoor environment by the PAH 4 and the FCU 3.

After receiving the first improving demand and the first improving capacity, the optimization processing unit 2 calculates the plurality of working combinations that can assist the indoor environment of the first zone to approach the first target comfort value in the predicted time according to the first improving demand and the first improving capacity (step S24). In this embodiment, the predicted time can be a system default, a best time value or a value set by the staff of the building 100 (such as 5 minutes or 10 minutes).

After the plurality of working combinations are calculated completely, the optimization processing unit 2 chooses a specific working combination which is the most power-saving one therefrom according to the basic power consumption of the plurality of air-side apparatuses (step S26), and then controls the PAH 4 and the FCU 3 to operate respectively according to the specific working combination (step S28).

It should be mentioned that this embodiment only takes the first zone for an instance, so the optimization processing unit 2 only needs to concern the first improving demand of the first zone when calculating and choosing the specific working combination. However, if other zones in the same floor also have their own improving demand, the optimization processing unit 2 needs to concern multiple improving demands of the multiple zones in the same floor simultaneously, so as to control the PAH 4 that is corresponding to this floor and the FCUs 3 that are respectively corresponding to these zones of this floor.

Figure 4:
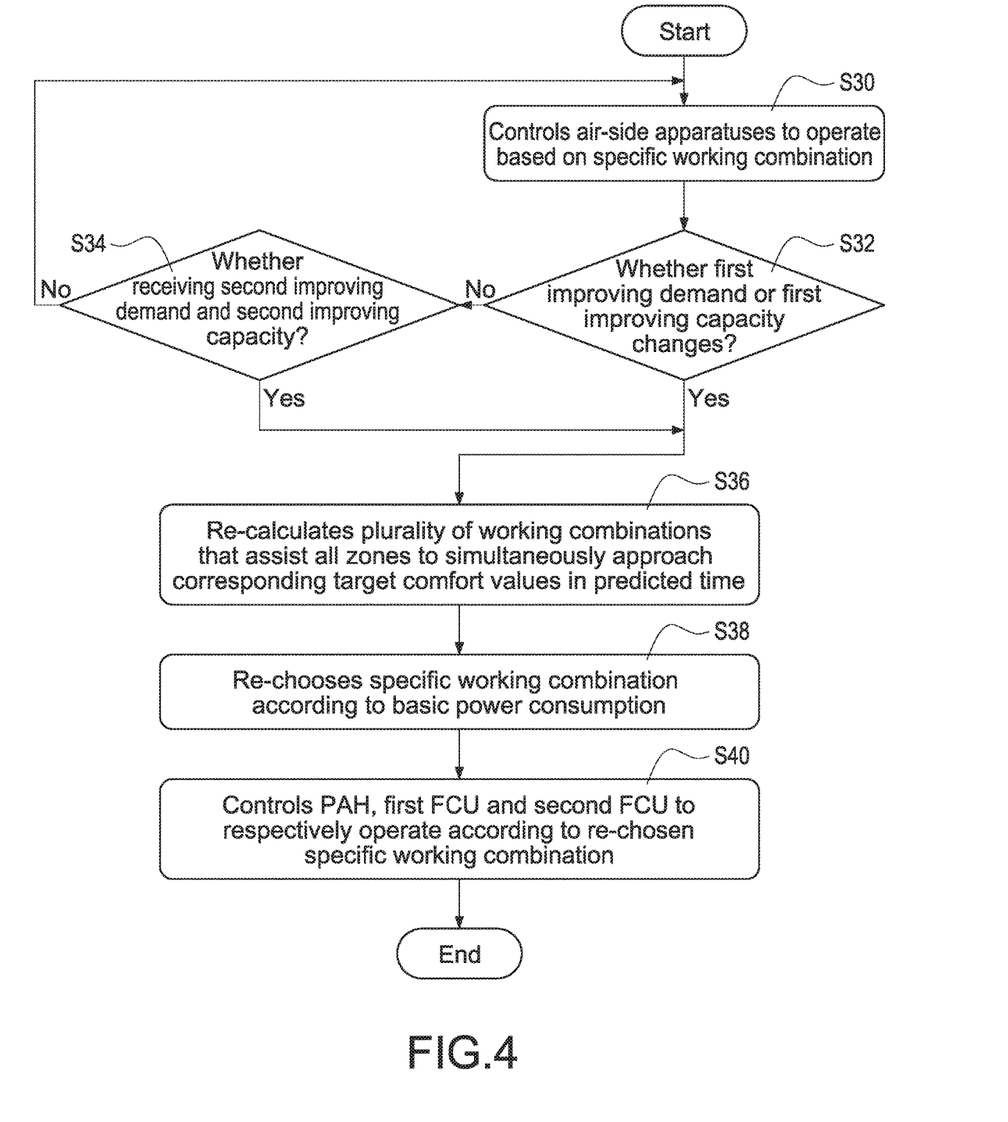
FIG. 4 is an optimization flowchart of a second embodiment according to the present invention.

FIG. 4 is an optimization flowchart of a second embodiment according to the present invention. As shown in FIG. 4, when the system 1 operates regularly, the optimization processing unit 2 controls the air-side apparatuses corresponding to the first zone to operate based on the aforementioned chosen specific working combination (step S30).

At the time the system 1 operates, the optimization processing unit 2 determines whether the first improving demand or the first improving capacity changes or not (step S32), and also determines whether a second improving demand and a second improving capacity are received (step S34). In this embodiment, the second improving demand is used to assist indoor environment of a second zone to approach a second target comfort value, and the second improving capacity is the improving capacity of the PAH 4 and a second FCU corresponding to the second zone. In particularly, the second improving capacity is the heat exchanging quantity and the air exchanging quantity that are provided by the PAH 4 and the second FCU to the second zone in a time period when operating in each working mode.

In this embodiment, the second zone and the first zone are located in same floor of the building 100, and both of the first zone and the second zone relate to the same PAH 4. Also, the optimization processing unit 2 obtains the second target comfort value, the second improving demand and the second improving capacity when detecting a person enters the second zone. The obtaining approach of the second target comfort value, the second improving demand and the second improving capacity is the same as the aforementioned first target comfort value, the first improving demand and the first improving capacity, the further discussion is omitted here for brevity.

If the first improving demand and the first improving capacity do not change, it means the indoor environment of the first zone does not change greatly (for example, indoor person amount is enormously increased, windows are opened or indoor temperature is enormously reduced to greatly change the indoor environment). If the second improving demand and the second improving capacity are not received, it means there's no person enters the second zone. As such, the system 1 goes back to the step S30, the optimization processing unit 2 keeps to control the PAH 4 and the FCU 3 (i.e., the first FCU) corresponding to the first zone based on the specific working combination. It should be mentioned that the step S32 and the step S34 do not have an execution order and can be executed simultaneously.

If the first improving demand or the first improving capacity changes, or the second improving demand and the second improving capacity are received, the optimization processing unit 2 re-calculates the plurality of working combinations that can assist all zones having improving demand to simultaneously approach the corresponding target comfort values in the predicted time (step S36).

More specifically, if receiving the second improving demand and the second improving capacity, the optimization processing unit 2 re-calculates the plurality of working combinations for the indoor environment of the first zone and the second zone to respectively approach the first target comfort value and the second target comfort value in the predicted time according to the first improving demand, the first improving capacity, the second improving demand and the second improving capacity.

Next, the optimization processing unit 2 re-chooses the specific working combination according to the basic power consumption of the plurality of air-side apparatuses (such as the PAH 4, the first FCU related to the first zone and the second FCU related to the second zone) (step S38). Finally, the optimization processing unit 2 controls the PAH 4, the first FCU and the second FCU to respectively operate according to the re-chosen specific working combination (step S40).

It should be mentioned that in the step S38, the optimization processing unit 2 calculates the power consumption of each of the working combinations through the following formula:

$$P = \sum_{i=1}^{M} P(FCU_i) + \sum_{j=1}^{N} P(PAH_j)$$

In the above formula, $FCU_i$ indicates the FCU 3, $PAH_j$ indicates the PAH 4, M indicates the amount of the FCU 3 that needs to be controlled (corresponding to all zones that have the improving demand), N indicates the amount of the PAH 4 that needs to be controlled (corresponding to all zones that have the improving demand), P indicates the total power consumption. By reference to the above formula, the optimization processing unit 2 can easily find out which working combination can make the total power consumption as a minimum.

Figure 5:
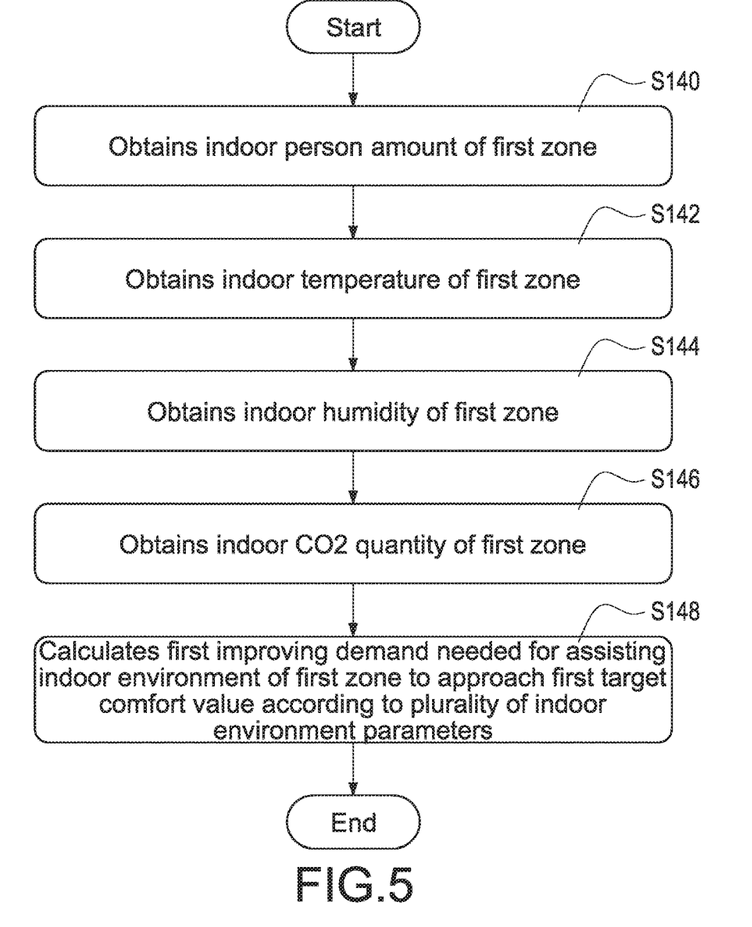
FIG. 5 is a demand calculating flowchart of a first embodiment according to the present invention.

FIG. 5 is a demand calculating flowchart of a first embodiment according to the present invention. The embodiment shown in FIG. 5 is used to detailed describe the step S14 in FIG. 3. As shown in FIG. 5, when calculating the first improving demand of the first zone, the system 1 first needs to obtain the plurality of indoor environment parameters of the first zone. In particularly, the system 1 obtains the indoor person amount of the first zone (step S140), the indoor temperature of the first zone (step S142), the indoor humidity of the first zone (step S144), and the indoor $CO_2$ quantity of the first zone (step S146). The step S140 to the step S146 are executed simultaneously by the plurality of sensors of the first zone, there is no execution order among these steps.

After obtaining the plurality of indoor environment parameters, the system 1 then calculates the first improving demand needed for assisting the indoor environment of the first zone to approach the first target comfort value according to the plurality of indoor environment parameters (step S148). As mentioned above, the first improving demand is the heat exchanging quantity and the air exchanging quantity that can assist the indoor temperature, the indoor humidity, and the indoor $CO_2$ quantity of the first zone to respectively approach the target temperature, the target humidity, and the target $CO_2$ quantity.

Figure 6:
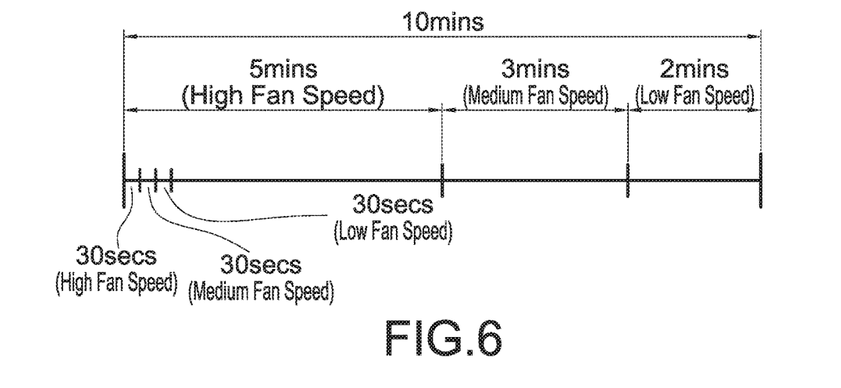
FIG. 6 is a schematic view of testing of a first embodiment according to the present invention.

FIG. 6 is a schematic view of testing of a first embodiment according to the present invention. In this embodiment, the air-side apparatuses respectively test their first improving capacity at the first short time period after being booted. The embodiment shown in FIG. 6 takes the first FCU of the first zone for an instance. As shown in FIG. 6, if the predicted time is 10 minutes, the first FCU will, after booting, take the first 30 seconds to operate in a first working mode (such as the High Fan Speed), take the second 30 seconds to operate in a second working mode (such as Medium Fan Speed), and take the third 30 seconds to operate in a third working mode (such as Low Fan Speed), and the first FCU tests the heat exchanging quantity and the air exchanging quantity that can provide to the first zone during operation in each working mode.

If the first FCU only has the above three working modes, then after 1 minute and 30 seconds, the system 1 can obtain the testing data of the first FCU, and then calculates the first improving capacity of the first FCU that can provide to the current indoor environment of the first zone when operating in each working mode.

As mentioned above, the system 1 may refer to the plurality of improving factors when calculating the first improving capacity. The improving factors can be at least one of the working modes of the first FCU (such as fan speed, valve on/off status, valve open degree, etc.), the working modes of the PAH 4 (such as fan speed, valve on/off status, valve open degree, etc.), outdoor temperature, size of the first zone, indoor temperature, indoor humidity, indoor $CO_2$ quantity, indoor person amount, current time and environmental history data of the first zone.

After the aforementioned optimization demand is triggered, the first FCU transmits the first improving capacity to the optimization processing unit 2, and accepts the control of the optimization processing unit 2. In the embodiment shown in FIG. 6, the first FCU accepts the optimization processing unit's control after completing the test, and operates in the first working mode by 3 minutes and 30 seconds, then changes to operate in the second working mode by 3 minutes, and then changes again to operate in the third working mode by 2 minutes. Therefore, the indoor environment of the first zone can approach the first target comfort value in 10 minutes (i.e., the predicted time). Also, because the first FCU does not continue working in the first working mode that is the most power-consuming one, the power consumption of the first FCU can be saved in order to achieve the purpose of power-saving.

The embodiment shown in FIG. 6 tests every working mode of the first FCU in 30 seconds, but not limited thereto. Also, 30 seconds is not enough for testing, and it may cause impreciseness of the first improving capacity which is calculated according to the testing data. Accordingly, the system 1 can apply the environmental history data (such as the testing data and the plurality of improving factors obtained and recorded yesterday, two days earlier or last week), and weights the environmental history data when calculating the first improving capacity. Also, during the operation, the first FCU continues testing the first improving capacity and updating the ability list.

Figure 7:
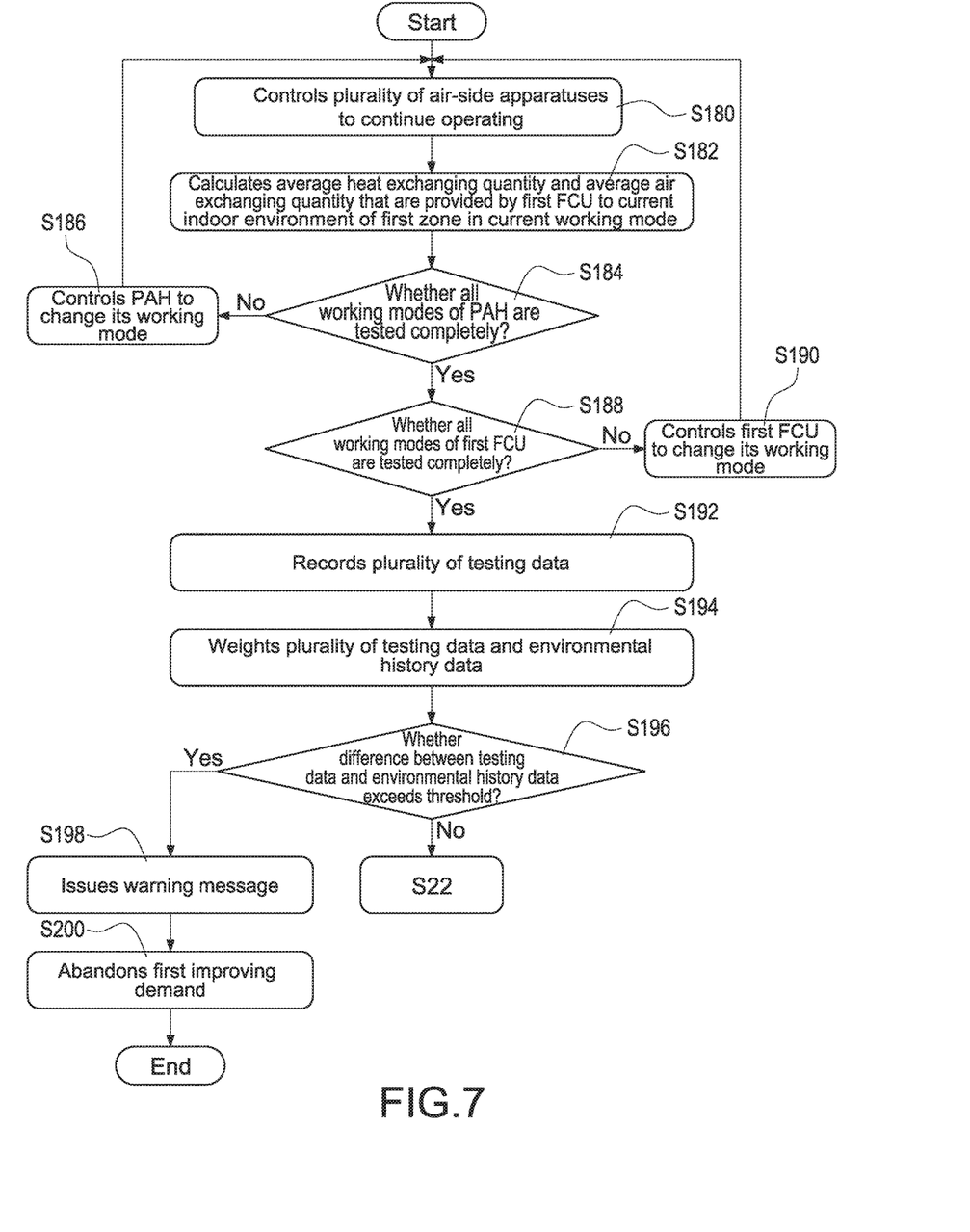
FIG. 7 is a flowchart of calculating air-exchanging ability of a first embodiment according to the present invention.

FIG. 7 is a flowchart of calculating air-exchanging ability of a first embodiment according to the present invention. The embodiment shown in FIG. 7 is used to detailed describe the step S18 in FIG. 3. As shown in FIG. 7, when calculating the first improving capacity, the system 1 first controls the plurality of air-side apparatuses to continue operating (step S180). Next, it calculates average heat exchanging quantity and average air exchanging quantity that are provided by the first FCU to the current indoor environment of the first zone in the current working mode (step S182), and regards the average heat exchanging quantity and the average air exchanging quantity as the testing data. Next, it determines whether all working modes of the PAH 4 are tested completely (step S184).

Before all working modes of the PAH 4 are tested completely, the system 1 controls the PAH 4 to change its working mode (step S186), and re-executes the step S180 to the step S184.

After all working modes of the PAH 4 are tested completely, the system 1 further determines whether all working modes of the first FCU are tested completely (step S188). If not all working modes of the first FCU are tested completely, the system 1 then controls the first FCU to change its working mode (step S190), and re-executes the step S180 to the step S188.

After all working modes of the first FCU are tested completely, the system 1 records the plurality of testing data (step S192). In a preferred embodiment, the system 1 regards the plurality of testing data as the first improving capacity directly and records them in the ability list. After the step S192, the optimization processing unit 2 calculates the specific working combination according to the first improving capacity.

However, for preventing the problem that the testing time is too short to make the first improving capacity precise, after the step S192, the system 1 further obtains the environmental history data of the first zone, and weights the plurality of testing data and the environmental history data (step S194). Therefore, the calculation of the first improving capacity is more objective.

The above environmental history data can not only assist the system 1 to calculate the first improving capacity more precise, but also be used to determine whether an abnormal phenomenon occurs in the indoor environment of the first zone or at these air-side apparatuses.

More specifically, the system 1 compares the plurality of testing data with the environmental history data, and determines whether a difference between the testing data and the environmental history data exceeds a threshold (step S196). If the difference exceeds the threshold, that indicates an abnormal phenomenon occurs (for example, windows of the first zone are opened, too many people indoor, the PAH 4 or the first FCU is too old or is broken, etc.), and the system 1 then issues a warning message (step S198).

If any abnormal phenomenon occurs, no matter what these air-side apparatuses operate, they may not assist the indoor environment of the first zone to approach the first target comfort value successfully. Therefore, the system 1 can abandon the first improving demand of the first zone (step S200). In other words, the system 1 can call the staff to manually handle the situation directly, instead of controlling these air-side apparatuses to operate with no improving effect and waste power.

By using the system and the method disclosed in the present invention, each air-side apparatus in a best situation can operate in lowest fan speed that is needed (i.e., the most power-saving mode of the air-side apparatus), and close the valve or adjust the valve to the lowest degree that is needed (i.e., the ice water does not float through the air-side apparatus, that is the most power-saving mode of the liquid chiller). Therefore, the present invention can achieve the purpose of power-saving through adjusting each of the plurality of air-side apparatuses.

As the skilled person will appreciate, various changes and modifications can be made to the described embodiment. It is intended to include all such variations, modifications and equivalents which fall within the scope of the present invention, as defined in the accompanying claims.

What is claimed is:

1. A power optimization system for air-side apparatus of air conditioning, comprising:
  an optimization processing unit, obtaining a first target comfort value of a first zone, and a first improving demand for an indoor environment of the first zone to approach the first target comfort value, wherein the first target comfort value comprises target temperature, target humidity and target $CO_2$ quantity, the first improving demand is heat exchanging quantity and air exchanging quantity needed for assisting indoor temperature, indoor humidity and indoor $CO_2$ quantity of the first zone to approach the target temperature, the target humidity and the target $CO_2$ quantity; and
  a plurality of air-side apparatuses for executing an air exchanging operation in the first zone, each of the air-side apparatuses comprising a pre-cooling air handling unit (PAH) and a first fan coil unit (FCU), wherein the PAH and the first FCU test a first improving capacity that is provided by the PAH and the first FCU to the current indoor environment of the first zone and transmit the first improving capacity to the optimization processing unit, wherein the first improving capacity is the heat exchanging quantity and the air exchanging quantity that are provided in a time period by the PAH and the first FCU to the first zone when operating in each working mode;
  wherein the optimization processing unit calculates a plurality of working combinations that assist the indoor environment of the first zone to approach the first target comfort value in a predicted time according to the first improving demand and the first improving capacity; the optimization processing unit chooses a specific working combination that is the most power-saving one of the plurality of working combinations according to basic power consumption of the plurality of air-side apparatuses, and the optimization processing unit controls the PAH and the first FCU to respectively operate according to the specific working combination,
  wherein, the PAH and the first FCU are configured to test the first improving capacity according to the following actions:
  action 1) testing average heat exchanging quantity and average air exchanging quantity that are provided by the first FCU to the current indoor environment of the first zone when operating in the current working mode to generate a testing data;
  action 2) changing working mode of the PAH and re-executing the action 1) if not all working modes of the PAH are tested completely;
  action 3) determining whether all working modes of the first FCU are tested completely after all working modes of the PAH are tested completely;
  action 4) changing the working mode of the first FCU and re-executing the action 1) to the action 3) if not all working modes of the first FCU are tested completely; and
  action 5) recording the plurality of testing data as the first improving capacity after all working modes of the first FCU are tested completely.

2. The power optimization system in claim 1, further comprising a plurality of sensors, which are arranged in the first zone and respectively sense a plurality of indoor environment parameters of the first zone, wherein the plurality of indoor environment parameters comprises the indoor temperature, the indoor humidity, the indoor $CO_2$ quantity and an indoor person amount.

3. The power optimization system in claim 2, wherein the plurality of sensors comprises a human detector for detecting if a person enters the first zone, and the human detector triggers the optimization processing unit to obtain the first target comfort value when detecting the person enters the first zone.

4. The power optimization system in claim 2, further comprising:
  a FCU controller, arranged in the first zone and connected to the first FCU, the FCU controller arranged to control the working modes of the first FCU;
  a zone controller, arranged in the first zone and connected to the optimization processing unit and the FCU controller, the zone controller arranged to control the FCU controller; and
  a programmable logic controller, connected to the optimization processing unit and the PAH.

5. The power optimization system in claim 4, wherein the FCU controller calculates the first improving demand according to the first target comfort value and the plurality of indoor environment parameters of the first zone, and also calculates the first improving capacity of the PAH and the first FCU, and transmits the first improving demand and the first improving capacity to the optimization processing unit.

6. The power optimization system in claim 5, wherein the FCU controller calculates the first improving capacity according to a plurality of improving factors, which comprises at least one of fan speed of the first FCU, valve on/off status of the first FCU, fan speed of the PAH, valve on/off status of the PAH, outdoor temperature, size of the first zone, indoor temperature, indoor humidity, indoor $CO_2$ quantity, indoor person amount, current time, and environmental history data of the first zone.

7. The power optimization system in claim 2, wherein the plurality of air-side apparatuses further comprises a second FCU that executes the air exchanging operation for a second zone in cooperating with the PAH; the optimization processing unit obtains a second target comfort value of the second zone when detecting a person enters the second zone, and also obtains a second improving demand for an indoor environment of the second zone to approach the second target comfort value.

8. The power optimization system in claim 7, wherein the PAH and the second FCU record a second improving capacity that provides to the current indoor environment of the second zone when operating in each working mode, the optimization processing unit re-calculates the plurality of working combinations for the indoor environment of both of the first zone and the second zone to approach the first target comfort value and the second target comfort value in the predicted time simultaneously according to the first improving demand, the first improving capacity, the second improving demand and the second improving capacity, and re-chooses the specific working combination according to the basic power consumption, and controls the PAH, the first FCU and the second FCU to respectively operate according to the re-chosen specific working combination.

9. A power optimization method for air-side apparatus of air conditioning, applied to a plurality of air-side apparatuses, each of the air-side apparatuses comprising a PAH and a first FCU used to execute an air exchanging operation for a first zone, the power optimization method comprising steps of:
   a) calculating a first improving demand for an indoor environment of the first zone to approach a first target comfort value, wherein the first target comfort value comprises target temperature, target humidity and target $CO_2$ quantity, and further comprising following steps of:
   a1) obtaining indoor temperature of the first zone;
   a2) obtaining indoor humidity of the first zone;
   a3) obtaining indoor $CO_2$ quantity of the first zone; and
   a4) calculating the first improving demand, wherein the first improving demand is heat exchanging quantity and air exchanging quantity needed for assisting the indoor temperature, the indoor humidity and the indoor $CO_2$ quantity to approach the target temperature, the target humidity and the target $CO_2$ quantity;
   b) testing a first improving capacity that is provided by the PAH and the first FCU to the current indoor environment of the first zone when operating in each working mode, wherein the first improving capacity is heat exchanging quantity and air exchanging quantity that are provided in a time period by the PAH and the first FCU to the first zone when operating in each working mode, and comprising:
   b1) testing average heat exchanging quantity and average air exchanging quantity that are provided by the first FCU to the current indoor environment of the first zone when operating in the current working mode to generate a testing data;
   b2) changing working mode of the PAH and re-executing step b1 if not all working modes of the PAH are tested completely;
   b3) determining whether all working modes of the first FCU are tested completely after all working modes of the PAH are tested completely;
   b4) changing the working mode of the first FCU and re-executing step b1 to step b3 if not all working modes of the first FCU are tested completely;
   b5) recording the plurality of testing data as the first improving capacity after all working modes of the first FCU are tested completely;
   c) transmitting the first improving demand and the first improving capacity to an optimization processing unit;
   d) calculating a plurality of working combinations needed for assisting the indoor environment of the first zone to approach the first target comfort value in a predicted time according to the first improving demand and the first improving capacity by the optimization processing unit;
   e) choosing a specific working combination that is the most power-saving one from the plurality of working combinations according to basic power consumption of the plurality of air-side apparatuses by the optimization processing unit; and
   f) controlling the PAH and the first FCU to respectively operate according to the specific working combination by the optimization processing unit.

10. The power optimization method in claim 9, wherein before the step a, the power optimization method further comprises following steps of:
    a01) detecting if a person enters the first zone; and
    a02) triggering the optimization processing unit to obtain the first target comfort value when detecting the person enters the first zone.

11. The power optimization method in claim 9, wherein the step b is to calculate the first improving capacity according to a plurality of improving factors, and the plurality of improving factors comprises at least one of fan speed of the first FCU, valve on/off status of the first FCU, fan speed of the PAH, valve on/off status of the PAH, outdoor temperature, size of the first zone, indoor temperature, indoor humidity, indoor $CO_2$ quantity, indoor person amount, current time and environmental history data of the first zone.

12. The power optimization method in claim 9, wherein the step b5 further comprises following steps of:
    b51) obtaining an environmental history data of the first zone; and
    b52) weighting the plurality of testing data and the environmental history data for generating the first improving capacity.

13. The power optimization method in claim 12, wherein the step b further comprises following steps of:
    b6) determining whether a difference between the testing data and the environmental history data exceeds a threshold;
    b7) issuing a warning message when the difference exceeds the threshold; and
    b8) abandoning the first improving demand when the difference exceeds the threshold.

14. The power optimization method in claim 9, wherein the power optimization method further comprises following steps of:

g) determining whether receiving a second improving demand and a second improving capacity, wherein the second improving demand is used to assist indoor environment of the second zone to approach a second target comfort value, and the second improving capacity is heat exchanging quantity and air exchanging quantity that are provided in a time period by the PAH and a second FCU related to the second zone when operating in each working mode;

h) when receiving the second improving demand and the second improving capacity, re-calculating the plurality of working combinations that can assist the indoor environment of both of the first zone and the second zone to approach the first target comfort value and the second target comfort value in the predicted time simultaneously based on the first improving demand, the first improving capacity, the second improving demand and the second improving capacity; and i) re-choosing the specific working combination according to the basic power consumption, and controlling the PAH, the first FCU and the second FCU to respectively operate according to the specific working combination.

15. The power optimization method in claim 14, wherein the optimization processing unit obtains the second target comfort value, the second improving demand and the second improving capacity whenever a person enters the second zone.

16. The power optimization method in claim 14, wherein the power optimization method further comprises a step j of: determining whether the first improving demand or the first improving capacity changes; wherein the step h is to re-calculate the plurality of working combination when the first improving demand or the first improving capacity changes, or when receiving the second improving demand and the second improving capacity.

* * * * *